United States Patent

[11] 3,576,047

[72] Inventor John C. Willis
 Juneau, Alaska
[21] Appl. No. 852,317
[22] Filed Aug. 22, 1969
[45] Patented Apr. 27, 1971
[73] Assignee Alaska Peelers, Inc.
 Seattle, Wash.
 Continuation-in-part of application Ser. No. 626,848, Mar. 29, 1967, now Patent No. 3,466,699, Continuation-in-part of application Ser. No. 782,051, Dec. 9, 1968, Patent No. 3,465,383.

[54] SHRIMP-PEELER APPARATUS
 2 Claims, 5 Drawing Figs.
[52] U.S. Cl. .................................................. 17/73
[51] Int. Cl. .................................................. A22c 29/00
[50] Field of Search .................................. 17/55, 71, 73

[56] References Cited
UNITED STATES PATENTS

| | | | |
|---|---|---|---|
| 1,893,903 | 1/1933 | Mullins | 17/55 |
| 2,644,980 | 7/1953 | McKinstry | 17/72 |
| 2,879,538 | 3/1959 | Peuss | 17/71 |
| 3,229,326 | 1/1966 | Eriksen | 17/55 |
| 3,348,260 | 10/1967 | Bartels et al. | 17/55 |

Primary Examiner—Lucie H. Laudenslager
Attorney—Clinton L. Mathis

ABSTRACT: Apparatus for peeling cooked shrimp including a cooker belt conveyor having shrimp spread crosswise thereof. Distributor chutes dividing shrimp from said conveyor into a plurality of separate parallel streams. An air chute and air blower for each stream so that shrimp are oriented to travel with their heads trailing down said air chute. A shaker table to maintain such orientation of shrimp position during travel and to space the shrimp so they travel in sequence one after the other. Shrimp-deshelling means receiving said shrimp traveling one after the other and with said shrimp-deshelling means comprising rotary driven shrimp-deshelling discs to receive therebetween shrimp.

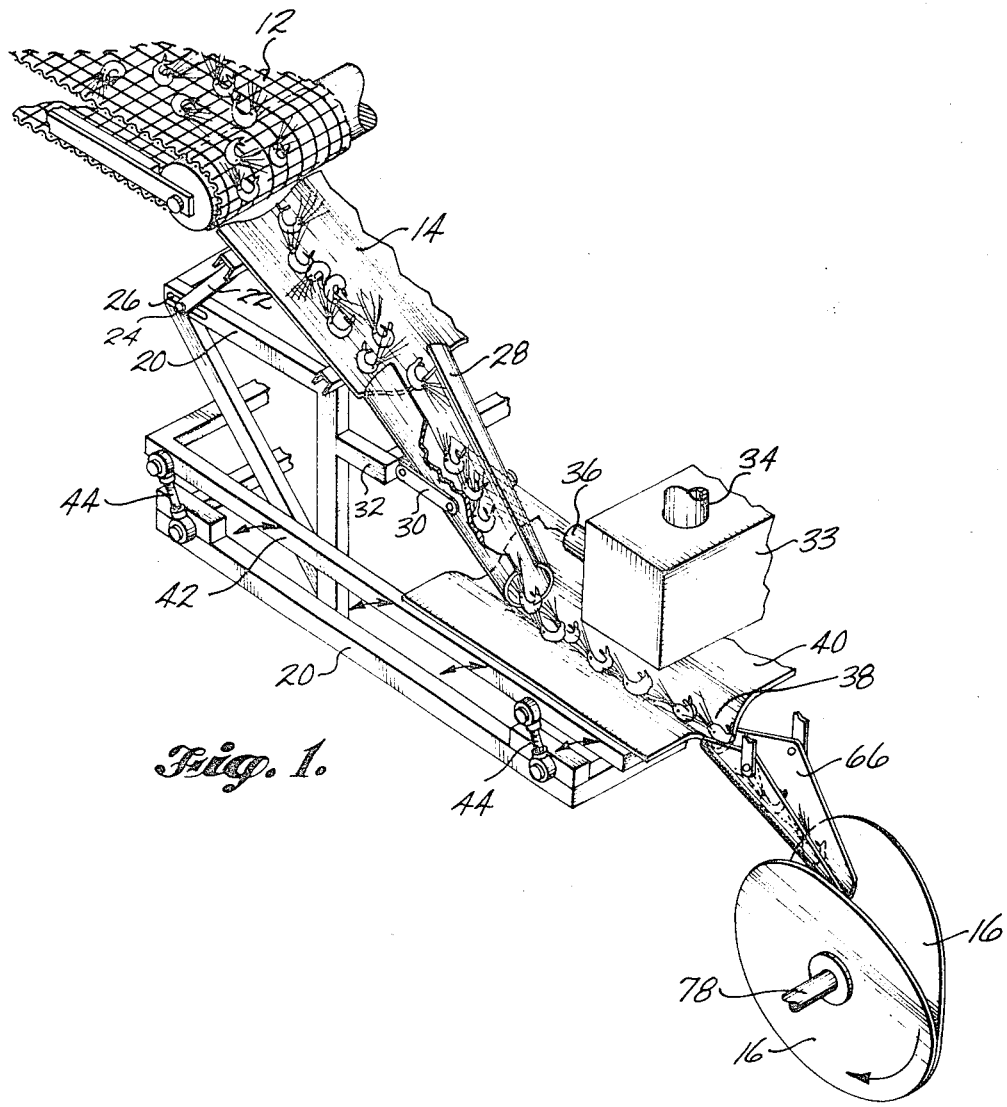

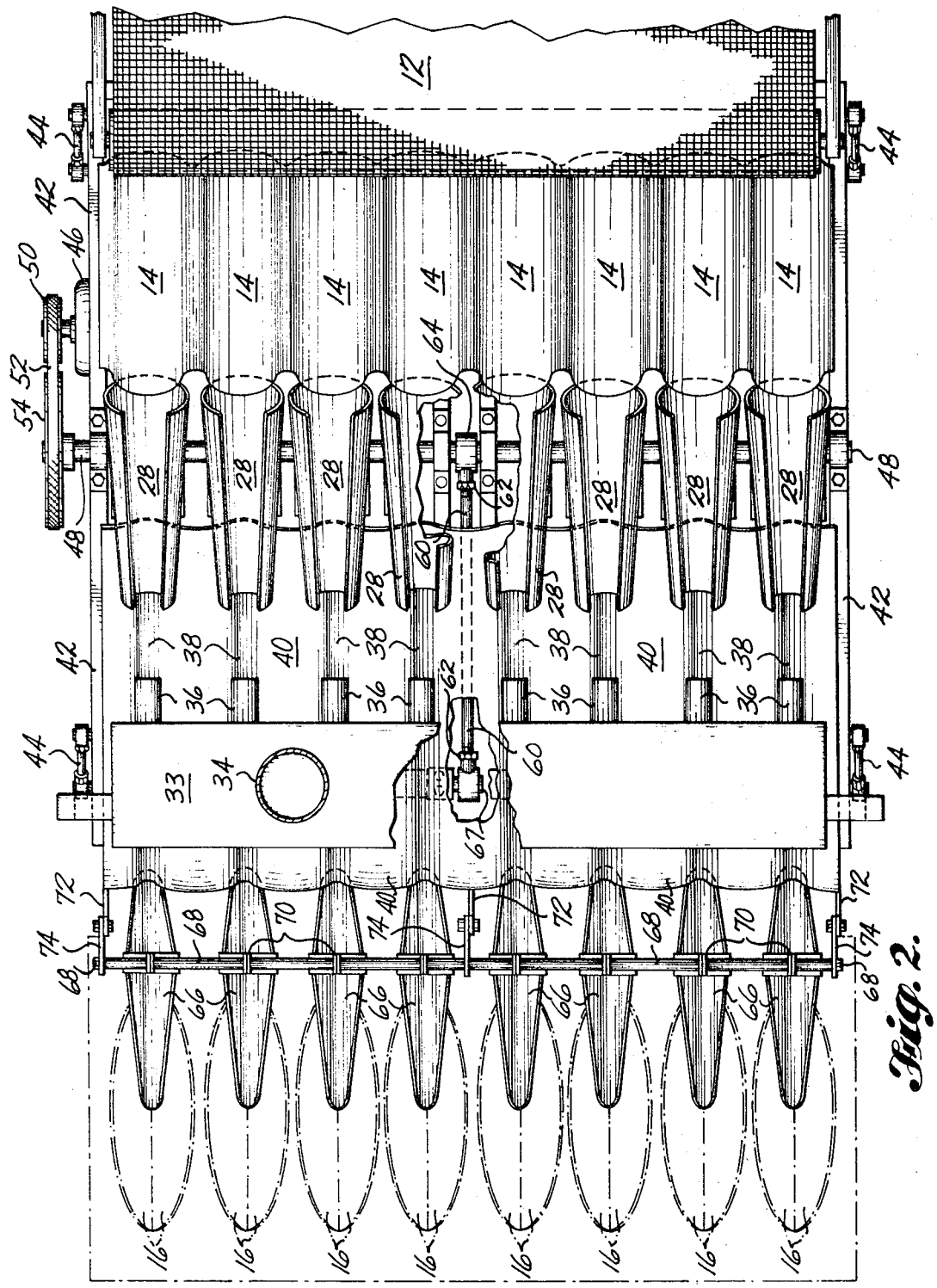

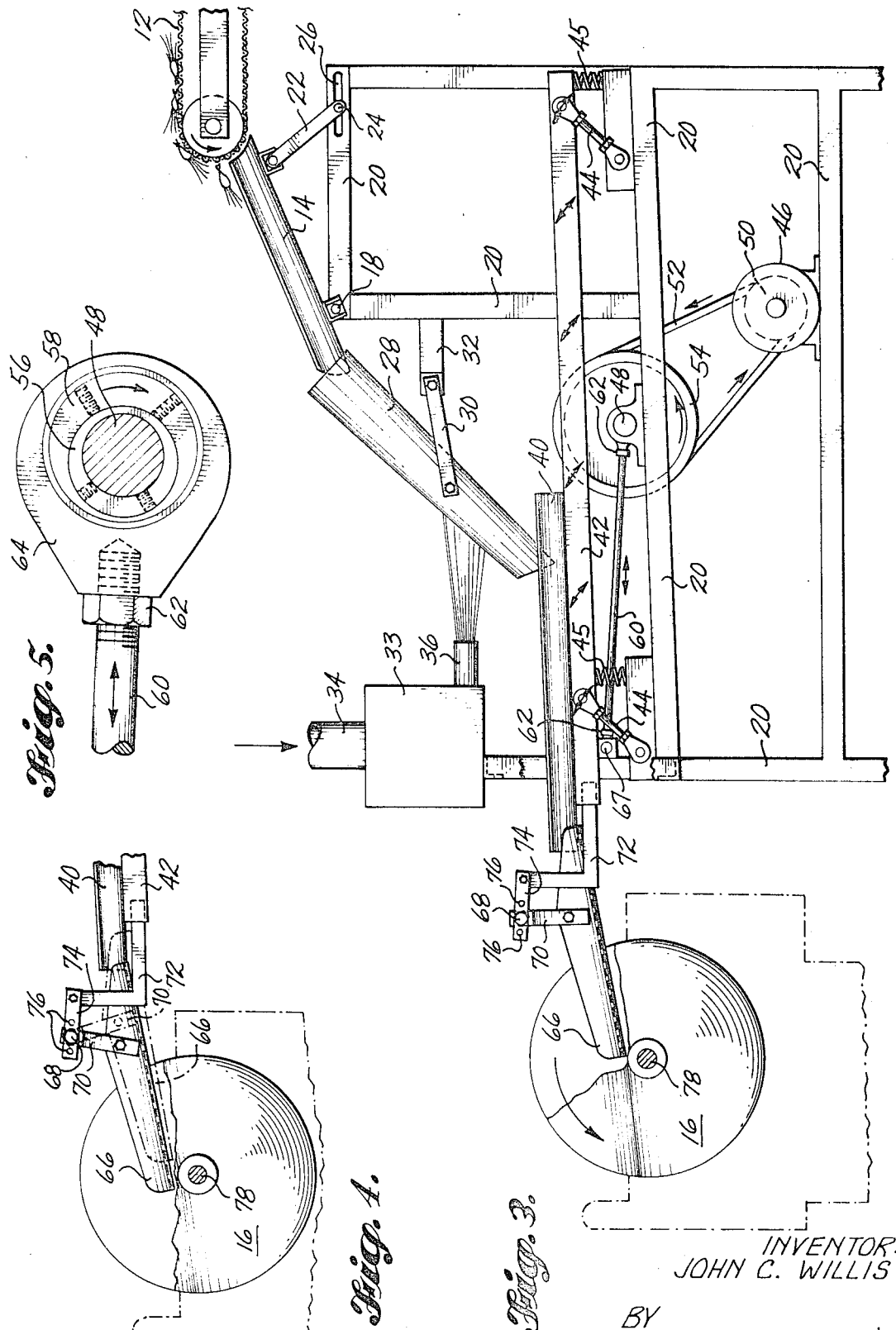

SHRIMP-PEELER APPARATUS

This invention is a continuation-in-part of copending applications Ser. No. 626,848 filed Mar. 29, 1967, and Ser. No. 782,051 filed Dec. 9, 1968, and now respectively, U.S. Pat. Nos. 3,466,699 and No. 3,465,383.

This invention relates to the peeling or deshelling of cooked or boiled shrimp and particularly to the feeding of shrimp to mechanical shrimp-deshelling means.

In said patents, the disclosure of the earlier one filed is characterized in a broad general sense, by the rotating shrimp-deshelling discs and the latter, by the air chutes and air blower means to orient the shrimp during their travel to the deshelling discs to travel with their head portions trailing. The improvement of the present invention is characterized broadly by apparatus for causing said shrimp to continue to travel in said oriented positions and to travel in sequence, one after another.

It is an object of this invention to cause shrimp to travel in sequence one after another so that one shrimp does not interfere with another and certain portions of the shrimp bodies of each shrimp are first presented to the mechanical shrimp-picking means, which preferably comprises two rotary driven shrimp-deshelling discs.

It is a further object to provide a shaker table providing thereon a longitudinally extending groove and to cause shrimp to travel along said groove.

It is a further object to mount said shaker table for combination movements of forwardly and backwardly, and upwardly and downwardly.

It is a more specific object to mount the deck of such shaker table pivotally on the end portions of pivotally mounted links and to mechanically reciprocate such deck by an adjustable crank arm.

Another more specific object is to mount such a shaker table deck on springs which are compressed during the downward stroke of the deck and which springs exert their pressure and thus augment the upward stroke of the deck.

Another more specific object is to provide a delivery chute, adjustable in length, connected to said shaker table so that the delivery end portion of said delivery chute may be adjusted relative to the center of rotation of the shrimp-deshelling discs receiving shrimp therebetween.

Other objects of this invention will become inherent and implicit as the description of this invention proceeds in connection with the drawings, wherein like reference numerals refer to like parts and wherein:

FIG. 1 is a somewhat perspective view illustrating this invention and with the showing being fragmentary;

FIG. 2 is a plan view;

FIG. 3 is a elevational view;

FIG. 4 is a fragmentary view of the feed chutes and shelling discs shown in FIG. 3 and showing two positions which said feed chute may assume, one in full lines and one in dot-and-dash lines; and FIG. 5 is an enlarged fragmentary view of the crank arm and eccentric drive therefor.

Cooked shrimp 10, preferably freshly cooked by conventional means (not shown), are delivered onto a traveling conveyor cooker belt 12. This cooker belt 12 is preferably formed of wire mesh so that the same is flexible and at the same time moisture may readily drain therethrough. The shrimp are spread crosswise on the conveyor cooker belt 12 in a random pattern so far as the orientation of the heads of the shrimp are concerned and the heads may thus point in any direction. Preferably scraper means (not shown) are used so that the shrimp are spread crosswise of the belt to a certain degree of uniformity.

Shrimp discharging over the discharge end portion of the conveyor cooker belt 12 are discharged into laterally spaced apart and parallel distributor chutes 14. There will be a distributor chute 14 for each pair of shrimp-shelling discs 16 and hence in the drawings there are eight distributor chutes 14 and eight pairs of discs 16. The distributor chutes 14 divide the shrimp discharging from the cooker belt 12 into a plurality of separate streams of shrimp and the uniformity of these streams will depend upon the uniformity of spread of the shrimp crosswise on the conveyor cooker belt 12.

Each distributor chute 14 has its lower end portion pivotally supported by pivot means 18 carried by frame members 20. An upper end portion of each distributor chute 14 is pivotally connected to an end portion of a link 22 and the other end portion of each link 22 is connected with a cross pin 24, which is slidable in a slot 26 in the frame member 20. By conventional means (not shown) a selected position of each cross pin 24 in the slot 26 may be selected and maintained and in turn a selected incline of a chute 14 may be maintained. The incline of a chute 14 is selected in relation to the travel of conveyor belt 12 so that the shrimp slide down the distributor chutes 14 away from the cooker belt 12 and thus the cooker belt 12 does not tend to cause a pile up of shrimp one on top of the other on the distributor chutes 14.

Shrimp discharging from each of the distributor chutes 14 are delivered onto air chutes 28. Air chutes 28 are spaced apart and parallel to each other and there will be an air chute 28 for each distributor chute 14. The degree of incline of each air chute 28 is adjustable and a selected adjustment may be maintained. As an illustration thereof, a link 30 is provided for each air chute 28 and one end portion of a link 30 is pivotally connected to a midportion of an air chute 28 and the link 30 has its other end portion pivotally connected to an arm 32 carried by frame member 20. Operating in conjunction with the air chute 28 is a manifold 33 having an air inlet 34 connected to a source of air under pressure (not shown) and a plurality of outlet nozzles 36, one directed at each of the air chutes 28. The mode of operation and the details of construction of the air chutes 28 and the air from nozzles 36 is set forth in detail and claimed in copending application Ser. No. 782,051, filed Dec. 9, 1968, and now U.S. Pat. No. 3,465,383. In the interest of brevity the details of such structure and mode of operation are not set forth herein in detail but the same is incorporated by reference from said patent. In general, the said air chutes 28 and the cooperating nozzles 36 and associated parts will be herein referred to as a shrimp position orienting means causing the shrimp head to be oriented in a given direction (such as trailing) during travel of the shrimp as the shrimp travel down the chute 28. The chutes 28 are in the shape of grooves in section and shrimp may travel down such grooves on their backs and with their heads trailing and are delivered into grooves 38 in the shaker table deck 40 and the positions of the shrimp are maintained, i.e., they remain on their backs and with their heads trailing as they travel forwardly in said grooves 38 in the shaker table deck 40.

The angle of inclination of the air chutes 28 must be greater than that of the distributor chutes 14 if both are to feed the same quantity of shrimp as the travel of shrimp down chutes 28 is resisted by air flowing from nozzles 36. Also, the relation between the feed of the various devices of the present invention will be later correlated when the various components thereof have been described.

Shaker frame 42 carries deck 40 of the shaker table. Links 44 are adjustable in length and one end portion of each thereof is pivoted to said frame 42 and the other end portion of each thereof is pivoted to the frame member 20. Coil springs 45 are disposed between frame 42 and frame member 20 and as the shaker frame 42 is lowered, said springs 45 are compressed and when the shaker frame 42 reaches its lowermost position, then said springs 45 exert their maximum upward thrust against said shaker frame 42.

Means to reciprocate shaker frame 42 and parts connected therewith comprises a prime mover, as electric motor 46. Such motor 46 drives cross-shaft (see also FIG. 5) at suitable speed through pulley 50 on the shaft of motor 46, belt 52 and pulley 54 on cross-shaft 48.

By way of illustration, but not as a limitation, an embodiment of this invention employed a motor 46 having a speed of approximately 1750 r.p.m., a pulley 50 of 4 inch diameter, and a pulley of 10 inch diameter. On the shaft 48 is mounted a double eccentric 56,58 to provide a crank arm of adjustable length between the shaft 48 and the eccentric housing 64. Rod 60 has its end portions threaded and locknuts 62 are provided at both ends so that the effective length of rod 60 may be adjusted. One end of rod 60 is connected with the eccentric housing 64 and the other end thereof is pivotally connected with shaker frame 42 by pivot means 67.

As motor 46 rotates, the motion thereof is translated by eccentrics 56,58 into reciprocating motion of rod 60. Due to the pivotal mounting of shaker frame 42 on links 44, the said reciprocating motion of rod 60 causes shaker frame 42 and the deck 40 carried thereby, to reciprocate, forward and backward, longitudinally. Likewise, the grooves 38 in the deck 40 of the shaker table and shrimp in said grooves are reciprocated. In addition to the forward and backward motion, there is also an up and down motion due to the mounting of shaker frame 42 by links 44 and this up and down movement is preferred. Also, as the springs 45 move from their fully compressed positions toward a released position, there is a quickened upward thrust or bounce. The combined results of these various motions causes shrimp to separate and travel in sequence one after another even though they may be somewhat stacked or piled one on top of another as they leave the air chutes 28 and as they are initially delivered onto the grooves 38 in the deck 40 of the shaker table. This motion does not cause the shrimp to lose their oriented position of traveling with their head portions trailing and tends to maintain such position in the grooves 38 and at the same time causes the shrimp to travel in sequence one after the other. Shrimp from each groove 38 in the deck of shaker table 40 are delivered to an aligned feed chute 66. A cross-shaft 68 (see FIGS. 2 and 3) mounts a plurality of said chutes 66 and said cross-shaft 68 is carried by brackets 70. Angular brackets 72 are carried by shaker frame 42 and thus move therewith. Also, each of said brackets 72 has a portion 74 provided with perforations 76. Brackets 70, carrying cross rod 68, may be secured to a desired perforation 76 and thus the relative length of the feed chute 66 to the axes 78 of the shelling discs 16 is determined. It has been determined that it is preferable for a feed chute 66 to be in a forward position (forward of the center of shafts 78) to feed small shrimp to the throat between shelling discs 16 and in a backward position (back of the center of shafts 78) to feed large shrimp to said throat.

The details of construction and mode of operation of the shelling discs 16 are set forth in copending applications Ser. No. 626,848 filed Mar. 29, 1967, and Ser. No. 782,051 filed Dec. 9, 1968, and now respectively U.S. Pat. Nos. No. 3,466,699 and No. 3,465,383. Such construction and mode of operation is hereby incorporated by reference in the interest of brevity herein and to the same extent as if set forth herein in full.

As shrimp are delivered with the head portions trailing between two shelling discs 16 from a feed chute 66, the speed of rotation of the peripheral portions of the discs which immediately contact the shrimp upon delivery to said shelling discs should be faster than the rate of travel of the shrimp along a feed chute 66. This is important so that the discs contact shrimp one at a time. This also allows a disc to seize and pull the shrimp before the next shrimp in a chute 66 reaches the end of such chute.

The chutes 66 have an angle of inclination greater than that of deck 40, thus the shrimp travel in the groove in chute 66 faster than they do in the grooves in the deck 40 of the shaker table even though both the deck 40 and the chutes 66 are subjected to the same forward and back, up and down motions. Such increase in travel speed is desirable and is readily obtained by providing the desired inclination of the feed chutes 66 relative to the incline of the deck 40.

Also, it is desirable that shrimp are not fed down the air chute 28 faster than they can be handled on the deck 40 of the shaker table. The rate of travel of shrimp down the air chute 28 can be readily slowed up by the amount of air delivered by the nozzles 36 and also the amount of inclination of the air chutes 28. Also, the amount of shrimp delivered by the distributor chutes 14 should not be greater than that which can be handled by the air chutes 28. In a general way, the shelling discs 16 are rotated at a speed to give maximum production with desirable quality of shrimp peeling. Then each of the preceding elements is regulated in speed so as to deliver the quantity of shrimp which each can handle, namely, starting from the shelling disc 16, then the feed chutes 66 are regulated, then the shrimp delivered from shaker deck 40 is regulated to be consistent with what can be handled in the feed chute 66. Next, the amount of shrimp delivered from the air chutes 28 is regulated as to what can be handled by the shaker table 40. Next the amount of shrimp delivered from the distributor chutes 14 is regulated as to what can be handled by the air chutes 28. Finally, the speed of rotation of the conveyor cooker belt 12 is regulated to deliver shrimp from the conveyor belt 12 onto the distributor chutes 14 in accordance with what said distributor chutes 14 can handle.

From the foregoing, it will now be apparent that a shrimp position orienting means comprises an air chute 28, air manifold 33, air inlet 34, and an air nozzle 36 causing shrimp to travel longitudinally in a grooved means in an air chute 28 and with the shrimp heads oriented to travel in a given direction, as trailing. Shrimp so oriented are delivered to a groove 38 in a shaker table 40. Here the orientation of the shrimp is maintained and the shaker table 40 causes the shrimp to travel in sequence, one after another, along said grooves 38. The shaker table 40 is mounted for reciprocating motion, forward and back, and longitudinally of the shaker table and grooves 38 therein. More particularly, the shaker table 40 is pivotally mounted on pivotally mounted links 44, thus providing the preferred motion of upwardly and forwardly and then backwardly and downwardly. Also, the carriage 42 and deck 40 thereof are moved by a crank arm, as double eccentric 56,58 and thus the throw of the crank arm is adjustable. Compression springs 45 are disposed between the carriage 42 and the main frame 20 of the device and thus said springs 45 are compressed on the downward travel of the carriage 42 and the force of said springs is released as the carriage 42 starts to travel upwardly. This provides a sudden impulse or jerk which is helpful to the shaker table or carriage 42 in best performing its previously mentioned functions.

Next, there is disclosed two vertically disposed and driven shrimp-peeling discs 16 mounted on a cross-shaft 78 and the peripheral portion of said two discs is separated to provide an infeed throat. To deliver shrimp to such a throat, there is provided a feed trough 66 which is longitudinally extending and delivers shrimp discharging from the shaker table 40. Preferably, the feed troughs 66 are connected with, and thus each has the same motion as, the shaker table 40. Also, each feed trough 66 is preferably adjustable in length and this obtains by reason of the perforations 76 in the portions 74 of the angular brackets 72. It is desirable to have such adjustability for the ultimate result in feeding of large or small shrimp between the deshelling discs 16.

The traveling shrimp-conveyor belt 12 receives thereon cooked shrimp 10 which are disposed in a random pattern crosswise thereof. A plurality of parallel, individual distributor chutes each receives a portion of the shrimp from cooker conveyor belt 12 and each of said distributor chutes delivers its shrimp by way of a groove in air chute 28, to a groove or unit 38 of the shaker table 40.

Obviously, changes may be made in the forms, dimensions and arrangements of the parts of this invention without departing from the principle thereof, the above setting forth only a preferred form of embodiment of this invention.

I claim:

1. A shrimp peeler comprising a shrimp position orienting means having a deck and a longitudinally extending groove therein for causing shrimp to travel longitudinally thereof in said groove means with the shrimp heads oriented in a given direction; and a shaker table for maintaining said orientation of the shrimp and to cause the shrimp to travel in sequence one after the other comprising a fixed support, a carriage mounted on said fixed support for reciprocating, forward and backward, longitudinal movement and up and down movement, a deck, carried by said carriage, having longitudinally extending groove means aligned with the groove means in said shrimp-orienting means to receive shrimp therefrom, and compression spring means disposed between said carriage and said fixed support, said spring means being aligned to be compressed on the downward movement of the carriage and released thereafter for upward movement of the carriage.

2. The combination of claim 1, with two driven, vertical shrimp-peeling discs mounted on a cross-shaft, a peripheral portion of said peeling discs being separable to provide an infeed throat between discs; a longitudinally extending trough delivering shrimp discharging from said shaker table to said infeed throat, said longitudinally extending trough being extensible and contractable in length to deliver shrimp to said infeed throat at variable distances from a transverse vertical plane passing through the center of said shrimp-peeling discs.